(12) United States Patent
Nandagopal

(10) Patent No.: US 11,520,606 B2
(45) Date of Patent: Dec. 6, 2022

(54) DYNAMIC GENERATION OF USER INTERFACE COMPONENTS BASED ON HIERARCHICAL COMPONENT FACTORIES

(71) Applicant: VMWARE, INC., Palo Alto, CA (US)

(72) Inventor: Lokesh Kumar Nandagopal, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/805,147

(22) Filed: Nov. 7, 2017

(65) Prior Publication Data

US 2019/0095225 A1 Mar. 28, 2019

(30) Foreign Application Priority Data

Sep. 22, 2017 (IN) .............................. 201741033759

(51) Int. Cl.
*G06F 9/451* (2018.01)
*G06F 8/38* (2018.01)
(Continued)

(52) U.S. Cl.
CPC ................ *G06F 9/451* (2018.02); *G06F 8/38* (2013.01); *G06F 40/137* (2020.01); *G06F 40/143* (2020.01)

(58) Field of Classification Search
CPC ...... G06F 3/0665; G06F 3/061; G06F 3/0484; G06F 3/0488; G06F 9/4443; G06F 3/0481; G06F 3/0482; G06F 3/04847; G06F 21/6218; H04L 67/1097; H04L 63/102; H04L 63/10; G06Q 30/0261; G06Q 50/00;
(Continued)

(56) References Cited

U.S. PATENT DOCUMENTS 6,230,318 B1 * 5/2001 Halstead .................. G06F 8/20
717/108
6,484,149 B1 * 11/2002 Jammes ................ G06Q 30/02
705/26.62
(Continued)

FOREIGN PATENT DOCUMENTS

AU 2014235404 A1 * 11/2015 ............. H04L 51/32
AU 2014295870 A1 * 3/2016 ......... G06F 3/04842
(Continued)

*Primary Examiner* — Steven P Sax
(74) *Attorney, Agent, or Firm* — Clayton, McKay & Bailey, PC

(57) ABSTRACT

Techniques for dynamically generating user interface (UI) components based on hierarchical component factories are disclosed. In one example, a component factory corresponding to each of a plurality of UI components may be defined. The plurality of UI components associated with an application may be registered with a common registry using associated metadata and configuration information. Each UI component may be mapped to a component factory of an associated parent UI component based on the associated metadata. A request to render at least a portion of the application on a UI may be received. At least one UI component corresponding to the request at each level in a hierarchy may be generated, at runtime, using the component factory associated with the at least one UI component and the common registry. The at least one generated UI component may be rendered on the UI.

26 Claims, 6 Drawing Sheets

(51) Int. Cl.
*G06F 40/137* (2020.01)
*G06F 40/143* (2020.01)

(58) Field of Classification Search
CPC ............... G09G 5/00; G09G 2340/145; G09G 2320/0252; G09G 2354/00; G09B 29/007; G09B 29/006; G06T 11/60; H04W 4/029
See application file for complete search history.

(56) References Cited

U.S. PATENT DOCUMENTS

| | | | | |
|---|---|---|---|---|
| 6,544,294 | B1* | 4/2003 | Greenfield | G11B 27/034 715/234 |
| 6,636,250 | B1* | 10/2003 | Gasser | G06F 3/0481 715/733 |
| 6,868,525 | B1* | 3/2005 | Szabo | G06Q 30/02 715/738 |
| 7,313,766 | B2* | 12/2007 | Kautto Kiovula | G06F 3/0481 715/851 |
| 7,490,319 | B2* | 2/2009 | Blackwell | G06F 11/3664 717/124 |
| 7,589,750 | B1* | 9/2009 | Stratton | G06F 3/0482 345/440 |
| 7,725,473 | B2* | 5/2010 | Lamb | H04L 67/1097 707/758 |
| 8,504,913 | B2* | 8/2013 | Marchant | G06F 16/972 715/255 |
| 8,719,119 | B1* | 5/2014 | Wargin | G06F 16/215 705/30 |
| 8,914,567 | B2* | 12/2014 | Miroshnichenko | G06F 3/0664 711/6 |
| 9,201,667 | B2* | 12/2015 | Ringdahl | H04L 63/08 |
| 9,349,128 | B1* | 5/2016 | Kerr | G06Q 30/0261 |
| 9,578,032 | B2* | 2/2017 | Beveridge | G06F 9/5016 |
| 10,110,450 | B2* | 10/2018 | Cook | H04L 67/56 |
| 10,834,072 | B2* | 11/2020 | Kelishadi | H04L 63/083 |
| 11,003,475 | B2* | 5/2021 | Bingham | G06T 11/206 |
| 2002/0010713 | A1* | 1/2002 | Egilsson | G06F 8/34 715/762 |
| 2005/0198605 | A1* | 9/2005 | Knol | G06F 30/392 716/124 |
| 2006/0236268 | A1* | 10/2006 | Feigenbaum | G06F 9/4488 715/853 |
| 2007/0073740 | A1* | 3/2007 | Kirshenbaum | G06F 9/4488 |
| 2007/0156661 | A1* | 7/2007 | Allen | H04L 41/22 |
| 2008/0046817 | A1* | 2/2008 | Sharp | G06F 8/38 715/700 |
| 2008/0120129 | A1* | 5/2008 | Seubert | G06Q 10/06 705/35 |
| 2010/0050130 | A1* | 2/2010 | Farn | G06F 8/38 715/853 |
| 2011/0138337 | A1* | 6/2011 | Walter | G06F 8/36 715/853 |
| 2012/0137268 | A1* | 5/2012 | Dattke | G06F 8/38 717/105 |
| 2015/0261525 | A1* | 9/2015 | Kwon | G06F 8/74 717/121 |
| 2016/0094510 | A1* | 3/2016 | Xiao | G06Q 10/107 709/206 |
| 2016/0349993 | A1* | 12/2016 | Udupi | G06F 3/061 |
| 2017/0034305 | A1* | 2/2017 | Blevins | H04L 67/20 |
| 2017/0052810 | A1* | 2/2017 | Bingham | G06F 9/45533 |
| 2017/0090701 | A1* | 3/2017 | Muller | G06F 3/0481 |
| 2017/0352174 | A1* | 12/2017 | Gorishniy | G06F 16/904 |
| 2018/0217964 | A1* | 8/2018 | Lin | H04W 52/027 |
| 2018/0292958 | A1* | 10/2018 | Martinez | G06F 3/0484 |

FOREIGN PATENT DOCUMENTS

| | | | | |
|---|---|---|---|---|
| CA | 2390440 C | * | 8/2011 | ............... G06F 8/30 |
| CA | 2802996 A1 | * | 12/2011 | ........ G06F 17/30575 |
| CA | 2856524 A1 | * | 5/2012 | ......... G06F 21/6218 |
| JP | 2004501427 A | * | 1/2004 | |
| JP | 2004334464 A | * | 11/2004 | |
| JP | 3790674 B2 | * | 6/2006 | ........... G06F 16/986 |
| JP | 3824298 B2 | * | 9/2006 | ....... G06F 17/30905 |
| JP | 4037662 B2 | * | 1/2008 | |
| JP | 4150965 B2 | * | 9/2008 | ............. G06Q 10/06 |
| JP | 4990431 B2 | * | 8/2012 | ........... G06F 16/313 |
| WO | WO-2014178021 A1 | * | 11/2014 | ......... G06F 3/03545 |
| WO | WO-2016210327 A1 | * | 12/2016 | ......... G06F 21/6218 |

\* cited by examiner

DYNAMIC GENERATION OF USER INTERFACE COMPONENTS BASED ON HIERARCHICAL COMPONENT FACTORIES

RELATED APPLICATIONS

Benefit is claimed under 35 U.S.C. 119(a)-(d) to Foreign Application Serial No. 201741033759 filed in India entitled "DYNAMIC GENERATION OF USER INTERFACE COMPONENTS BASED ON HIERARCHICAL COMPONENT FACTORIES", on Sep. 22, 2017, by VMware, Inc., which is herein incorporated in its entirety by reference for all purposes.

TECHNICAL FIELD

The present disclosure relates to graphical user interfaces (GUIs) and, more particularly, to dynamic generation of user interface (UI) components based on hierarchical component factories.

BACKGROUND

Web applications allow software to be hosted on a server and accessed and run on a client device. For example, web applications generally include software that can be run in a web browser. Web applications are particularly helpful when distributing and installing software on any potential client devices. For example, the web application may be maintained and updated at a single location (e.g., the server) such that any client with a browser can access and use the web application.

Generally, web application user interfaces (UIs) are static in the sense that they can only be changed by developers who have access to the web application source code or files. For example, the developers are required to hard-code the web application UI. Scripting language code may run locally within the context of a web browser, and can detect user actions, responsive to which certain activities and display changes can be rendered within the context of the web browser. Rendering of web applications may include identifying a component hierarchy from which the web applications can be rendered.

For example, UI components of a web application may be organized into logical groupings in a hierarchy of layers in the web application. The UI hierarchy may be represented by a tree data structure, comprising a root node, a number of intermediary nodes, and a number of leaf nodes. Each node may represent a layer, and each layer may include one or more UI components. At each level in the hierarchy of UI components, it is required to decide which UI child component to render dynamically at runtime.

Figure 1:
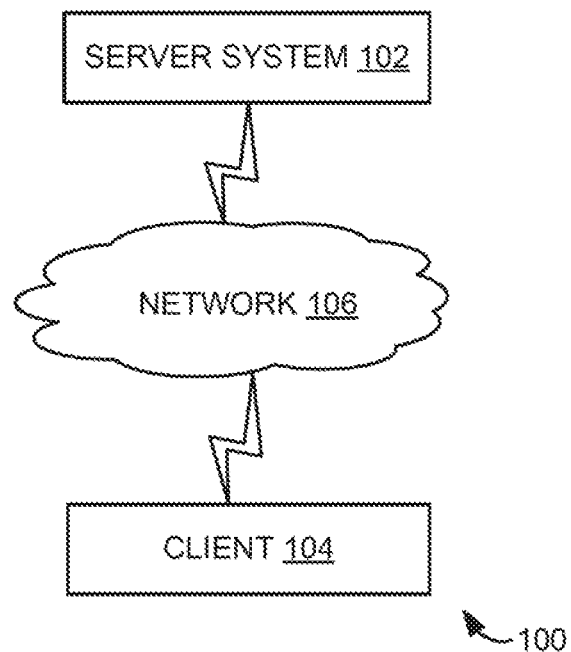
FIG. 1 is an example block diagram of a system for dynamic generation and rendering of user interface (UI) components based on hierarchical component factories, according to one embodiment.

The drawings described herein are for illustration purposes only and are not intended to limit the scope of the present subject matter in any way.

DETAILED DESCRIPTION

Embodiments described herein may provide an enhanced computer-based and network-based method, technique, and system for dynamically generating UI components based on hierarchical component factories. In a computing environment, a server may communicate with multiple clients such that any client with a browser can access and use a web application provided by the server. A client (e.g., a client computing device) may render a graphical user interface (GUI) associated with a web application for display. The GUI includes a hierarchy of UI components that may be represented by a tree data structure, including a root UI component, a number of intermediary UI components, and a number of leaf UI components. At each level in the hierarchy of UI components, it is a required to decide which UI child component to render dynamically at runtime. To overcome this problem, the dependencies may be hard-coded in the parent UI component (i.e., a parent UI component at each level in the hierarchical tree data structure). Hard-coding of the dependencies may enable to decide which child UI component to render, based on some input value. However, as there is a tight coupling between the parent and child UI components, it may be cumbersome to introduce new child UI components at any level in the hierarchy. Also, hard coding the dependencies in the parent UI component may provide a 1:1 dependency between parent and child UI components and can result in increasing number of UI components, which are difficult to maintain.

Examples described herein may enable rendering of UI components such as forms, tables, graphs, and the like using dynamically overridable hierarchical component factories. In one example, component factories may be defined corresponding to each UI component. Further, the UI components associated with an application may be registered with a common registry using associated metadata and configuration information. Each UI component may be mapped to a component factory of an associated parent UI component based on the associated metadata. Upon receiving a request to render at least a portion of the application on a UI, UI components corresponding to the request at each level in a hierarchy may be generated in run time using the component factory associated with the UI components and the common registry. The generated UI components may be rendered on the UI.

Examples described herein may dynamically render different UI components at each level in the hierarchy using the component factories defined at each UI component. Examples described herein may provide a unique approach to load the child UI components using a factory defined at each UI component using one of the following approaches:
1. Annotation driven configuration at each UI component.
2. Inheritable JavaScript Object Notation (JSON)/Extensible Markup Language (XML)/YAML Ain't Markup Language (YAML) configuration file declaring the hierarchical configurations.

Also, examples described herein may enable overriding of the UI components defined at each level in the hierarchy by redefining configurations at each child UI component's component factory. For example, consider a hierarchy of UI components as defined below:

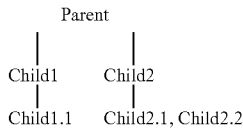

At each UI component, there is a corresponding component factory, for example, say parent component factory→child1 component factory, child2 component factory, and the like. Therefore, there are 1:N dependencies between parent→child UI components and the component factory decides which child UI component to render at each level in the hierarchy.

Based on the configurations defined above, i.e., either annotation based or inheritable file configuration, the parent component factory will decide whether to create child1 UI component or child2 UI component. In this example, let us consider child2 UI component is rendered, now child2 component factory may decide whether to render child2.1 or child2.2, and based on the configuration defined (e.g., in the common registry), child2 component factory may render the corresponding UI component.

Examples described herein may reduce the tight coupling between the dependencies by moving the configuration separately to the configuration file or using the annotation based configuration at each UI component level which can be simple and intuitive. Examples described herein may increase the simplicity and intuitiveness of adding any new UI components in the hierarchical tree data structure. Examples described herein may also reduce the 1:1 dependency between the parent and child UI components for creating any new UI component in the hierarchical tree data structure. Examples disclosed herein may be implemented in connection with cloud computing environments that use virtual machines (VMs) and/or containers. A VM is a data computer node that operates with its own guest operating system (OS) on a host using resources of the host virtualized by virtualization software. A container is a data computer node that runs on top of a host OS without the need for a hypervisor or separate OS.

System Overview and Examples of Operation

FIG. 1 is an example block diagram of a system 100 for dynamic generation and rendering of UI components based on hierarchical component factories, according to one embodiment. Examples described herein can be implemented in a cloud computing environment (e.g., virtualized cloud computing environment), which may include one or more computing platforms that support creation, deployment, and management of VM-based cloud applications. One such platform is the vRealize Automation®, which is commercially available from VMware. While vRealize Automation® is one example of a cloud deployment platform, it should be noted that any computing platform that supports the creation and deployment of virtualized cloud applications is within the scope of the present invention.

As shown in FIG. 1, system 100 may include a server system 102 and a client 104 which are in communication over a network 106. In one example, network 106 may include a plurality of networks including one or more of a local area network (LAN), a wide area network (WAN), the Internet, or another network or communication connection. In one embodiment, system 100 may be used to provide a UI for a web application.

Server system 102 may include a computing device or computing system that hosts a web application. Server system 102 may include a rack mounted server or other computing device, which may be accessed by one or more clients 104 over network 106. For example, server system 102 may be accessible over the Internet. In one example, server system 102 may require authorization before allowing access to the web application.

Further, server system 102 may store information about the web application including programming code, metadata describing the UI of the web application, or the like. Server system 102 may also store code for a rendering engine that can render visual display elements, such as UI assets, for a display screen or other visual interface for the web application. Server system 102 may provide code, metadata, or the like corresponding to the web application to client 104 in response to a request from client 104 for the web application.

Client 104 may include any type of computing device or system that can access server system 102. For example, client 104 may include a workstation, laptop computer, disconnectable mobile computer, server, mainframe, cluster (e.g., network computer" or "thin client"), tablet, smart phone, personal digital assistant or other hand-held computing device, "smart" consumer electronics device or appliance, medical device, or any other computing device which is capable of accessing a computer network.

Each of server system 102 and client 104 may include at least a processor, a memory, various input devices and/or output devices. Example input device(s) may include a keyboard, mouse, touch screen, light pen, tablet, microphone, sensor, or other hardware with accompanying firmware and/or software. Example output device(s) may include a monitor or other display, printer, speech or text synthesizer, switch, signal line, or other hardware with accompanying firmware and/or software.

In one example, client 104 may include a browser for accessing websites and executing web applications. In one example, client 104 may receive the metadata, code, or other information corresponding to a web application from server system 102 for execution within a browser of client 104. In another example, a plurality of clients 104 may be able to connect to and access server system 102.

Figure 2:
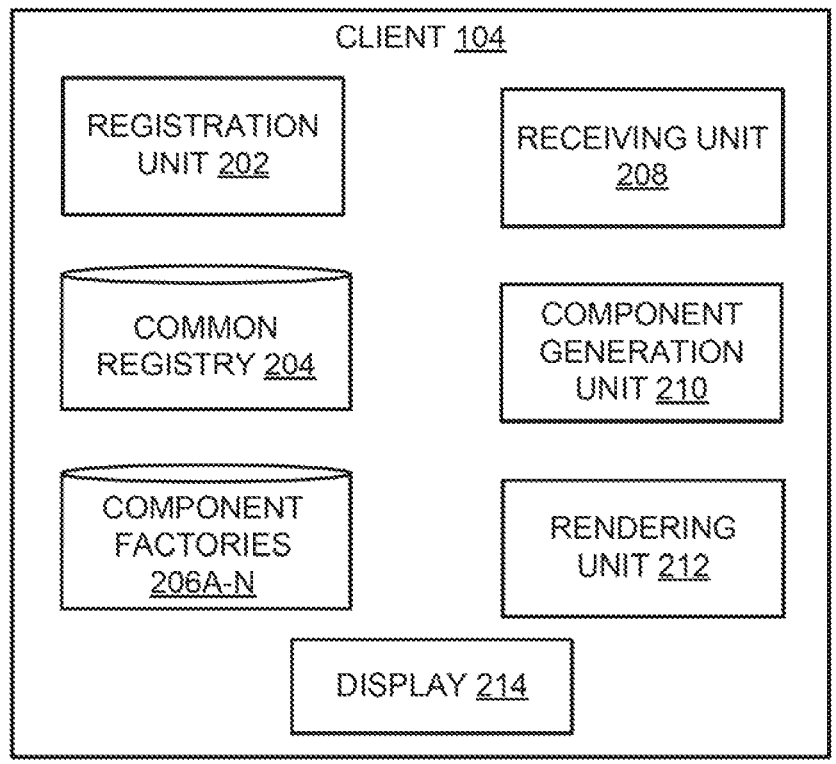
FIG. 2 is an example block diagram of a client for dynamic generation and rendering of UI components, according to one embodiment.

FIG. 2 is an example block diagram of client 104 for dynamic generation and rendering of UI components, according to one embodiment. Client 104 may include a registration unit 202, a plurality of component factories 206A-N, a common registry 204, a receiving unit 208, a component generation unit 210, and a rendering unit 212. Each component factory 206 may be associated with one of a plurality of UI components.

During operation, registration unit 202 may register the plurality of UI components associated with an application (e.g., web application) with common registry 204 using associated metadata and configuration information. Registration unit 202 may register the plurality of UI components associated with the application with common registry 204 during loading of the UI components at runtime in a browser.

In one example, registration unit 202 may register each of the plurality of UI components with common registry 204 using a name, an identifier, and a parent identifier information. For example, the name, the identifier, and the parent identifier information are defined in each UI component using an annotation based approach or a configuration file based approach. Example configuration file based approach may include a file selected from a group consisting of JSON, XML, and YAML configuration file that declares hierarchical configurations.

Further, registration unit 202 may map each UI component to one of component factories 206A-N of an associated parent UI component based on the associated metadata. In one example, registration unit 202 may map each UI component to a component factory 206 of the associated parent UI component in the hierarchy based on the parent identifier information defined in each UI component.

Further during operation, receiving unit 208 may receive a request to render at least a portion of the application on a UI, for example, from a user. In one example, UI may be rendered on a display 214 (e.g., output device), which can be a region in display 214 of client 104 for displaying data such as forms, tables, graphs, and/or images (e.g., a computer monitor).

Component generation unit 210 may generate, at runtime, at least one UI component corresponding to the request at each level in a hierarchy using component factory 206 associated with the at least one UI component and common registry 204. In one example, component generation unit 210 may generate the plurality of UI components associated with the application during loading of the UI components at runtime in the browser.

The UI components may include a parent UI component and child UI components at different levels in the hierarchy. In one example, component generation unit 210 may generate a parent UI component using a component factory (e.g., 206A) associated with the parent UI component and common registry 204 in response to the request at a first level in the hierarchy. In this example, common registry 204 may provide configuration information for configuring the parent UI component.

Further, component generation unit 210 may determine a first child UI component using the component factory (e.g., 206A) associated with the parent UI component and generate the first child UI component using the metadata and configuration information associated with the first child UI component in common registry 204 at a second level in the hierarchy. Similarly, component generation unit 210 may determine a second child UI component using the component factory (e.g., 206B) associated with the first child UI component and generate the second child UI component using metadata and configuration information associated with the second child UI component in common registry 204 at a third level in the hierarchy. Rendering unit 212 may render the at least one generated UI component on the UI. In this example, rendering unit 212 may render the parent UI component, the first child UI component, and the second child UI component on the UI according to the hierarchy. An example for rendering parent and child UI components is depicted in screen shot 500 of FIG. 5.

Figure 5:
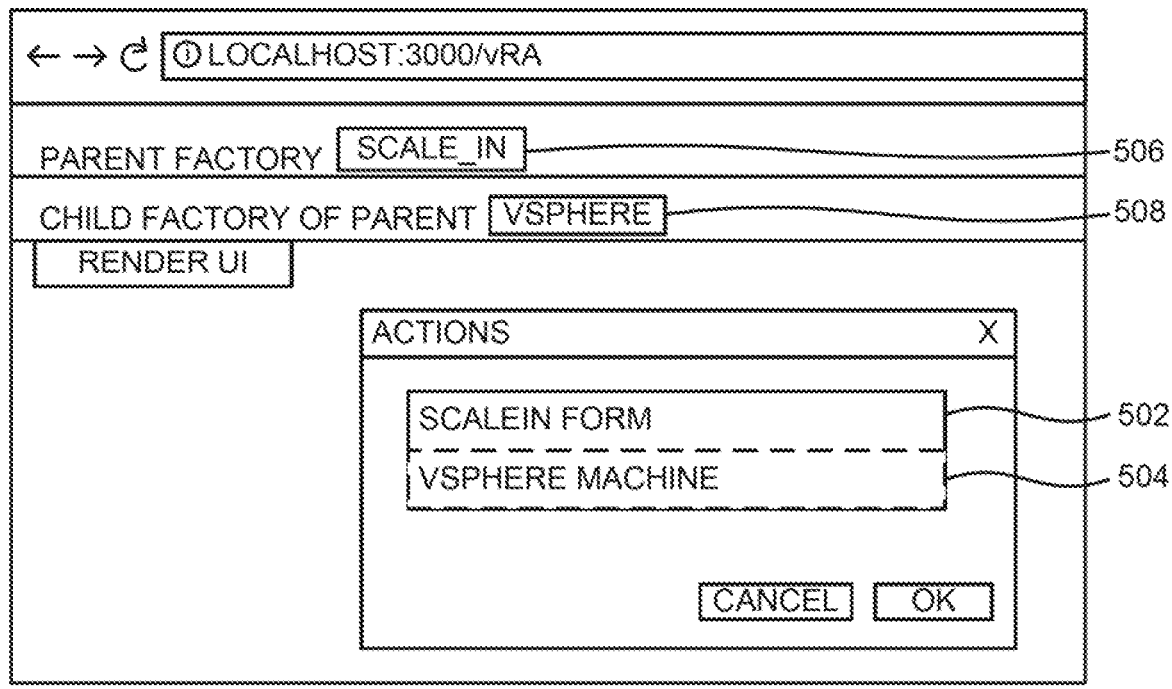
FIG. 5 illustrates an example screen shot, depicting a rendered parent UI component and a child UI component based on associated component factories.

FIG. 5 illustrates an example screen shot 500, depicting a rendered parent UI component 502 and a child UI component 504 based on associated component factories. Component factory 506 may be associated with parent UI component 502 (e.g., Scale-in) and component factory 508 may be associated with child UI component 504 (e.g., Vsphere). By way of an example, request may be received through selection of a UI element (e.g., component factories 506 and 508) that can be accomplished with an input device such as a mouse, a motion detector, voice commands, hand or eye gestures, and the like. For example, if a tab is selected, the page corresponding to that tab could be rendered. The tabs in FIG. 5 may be displayed horizontally, in another example, the tabs could be displayed vertically or using some other suitable scheme such as a hierarchical menu. Component factory 508 may be mapped to the component factory 506 of parent UI component 502 "Scale-in" during registration of the UI component "Vsphere" and can be dynamically rendered on the UI during run time.

Further, the UI components at any level in the hierarchy can be overridable by redefining configuration of the at least one UI component using the registration process as described above. Furthermore, component generation unit 210 may store information (e.g., metadata and component information) associated with the generated at least one UI component in memory associated with client 104 or in memory associated with server system 102 via network 106. In one example, storing information associated with the generated UI components in memory associated with client 104 may enable reuse of the generated UI component by client 104. In another example, storing information associated with the generated UI components in memory associated with server system 102 may enable reuse of the generated UI component across the multiple clients.

In one example, when receiving unit 208 receives a request to render a new UI component on the UI, component generation unit 210 may determine whether the new UI component is available in a cache associated with client 104 or server system 102. When the new UI component is not available (i.e., not generated), component generation unit 210 may generate the new UI component, render the generated new UI component on the UI, and add the generated new UI component to the cache associated with client 104 or server system 102. When the new UI component is available, component generation unit 210 may retrieve the new UI component from the cache and render the retrieved new UI component on the UI.

Figure 3:
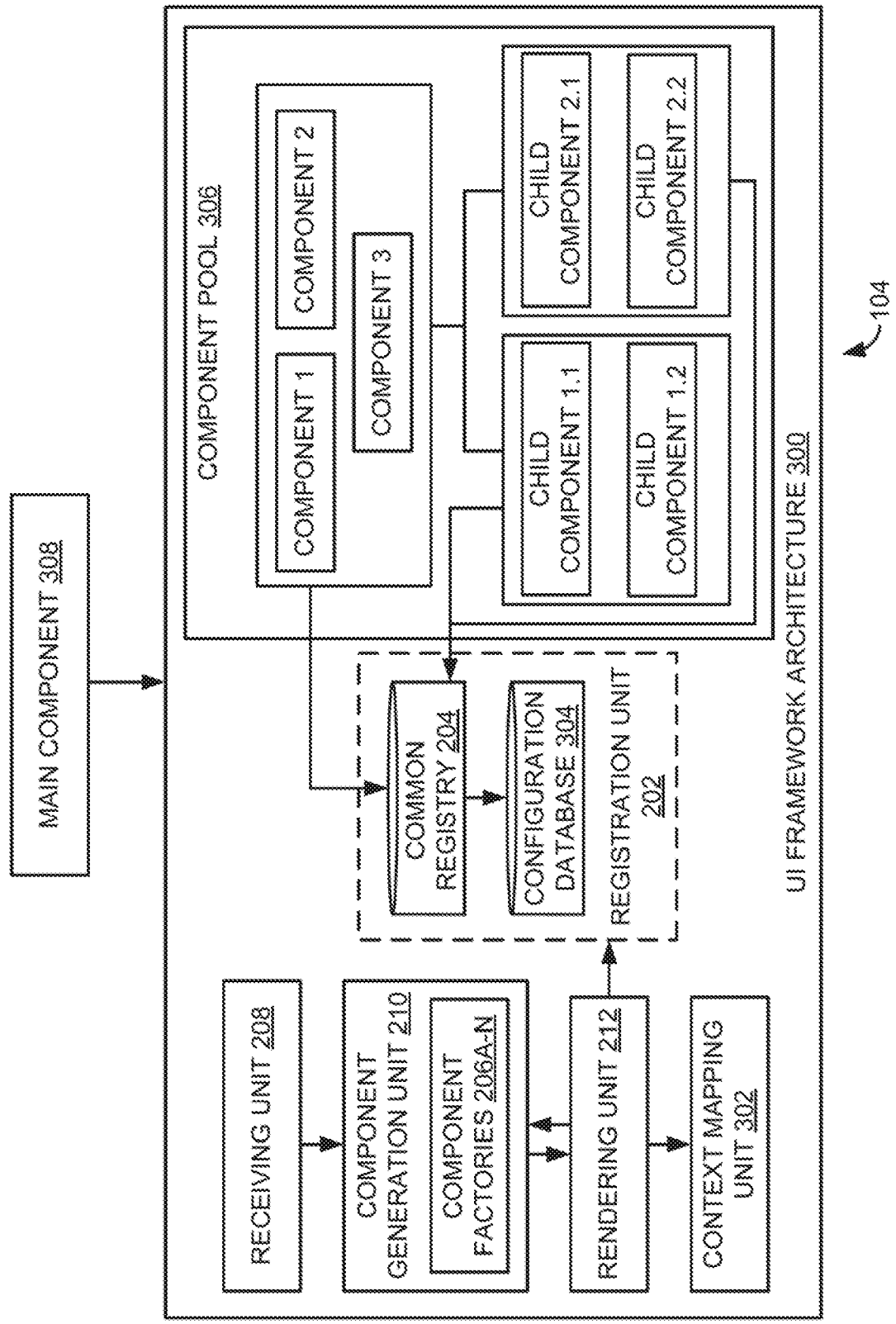
FIG. 3 is an example block diagram of the client, illustrating additional components for dynamic generation and rendering of UI components.

FIG. 3 is an example block diagram of client 104, illustrating additional UI components for dynamic generation and rendering of UI components. For example, similarly named elements of FIG. 3 may be similar in function to elements described with respect to FIG. 2. Client 104 may include a UI framework architecture 300 and a main component 308. As shown in FIG. 3, registration unit 202, component factories 206A-N, common registry 204, receiving unit 208, component generation unit 210, rendering unit 212, context mapping unit 302, configuration database 304 and component pool 306 can be implemented as part of UI framework architecture 300.

Main component 308 may be an application level component which contains all child UI components mentioned in component pool 306. For example, component pool 306 may be a list of UI components (e.g., parent UI components and the child UI components) provided by the application. These UI components may need to be registered themselves with common registry 204, for instance, using the annotation based approach or the configuration file based approach. Registration unit 202 may store the associated metadata and configuration information about the UI components in configuration database 304, which may be retrieved during generation of the UI components.

Common registry 204 may be a core part of UI framework architecture 300 which takes the component's metadata (e.g., from the annotation or the configuration file) as input when the UI components are loaded at runtime in the browser. Common registry 204 may store all the configuration and metadata information about the UI components in configuration database 304.

Component generation unit 210 may use component factories 206A-N to create the UI components based on the information received from main component 308. In one example, main component 308 may provide the information needed for rendering the UI by component generation unit 210. Component generation unit 210 may use this information to create the UI component. Component generation unit 210 may provide the created UI component to rendering unit 212 which may choose the UI components and a type of layout to render based on the context mappers (i.e., context information).

Once component generation unit 210 creates the UI component, the call may be delegated to rendering unit 212 by passing the related component context information to rendering unit 212 in the form of renderer context. Further, client 104 may include a context mapping unit 302 to retrieve context information associated with the at least one UI component. Rendering unit 212 may render the at least one generated UI component on the UI according to the retrieved context information.

Once a UI component is created, component generation unit 210 may send the metadata and component information including the HTML/JavaScript to the server-side cache which can then be reused. Component generation unit 210 may communicate with server-side cache which will maintain, for instance, an in-memory least recently used (LRU) cache to speed up the rendering of UI components. In one example, component generation unit 210 first checks the server-side cache to determine whether the UI component is already available. If the UI component is not available, component generation unit 210 may create the UI component, add the UI component to the server-side cache and render the UI component in the UI.

Figure 4:
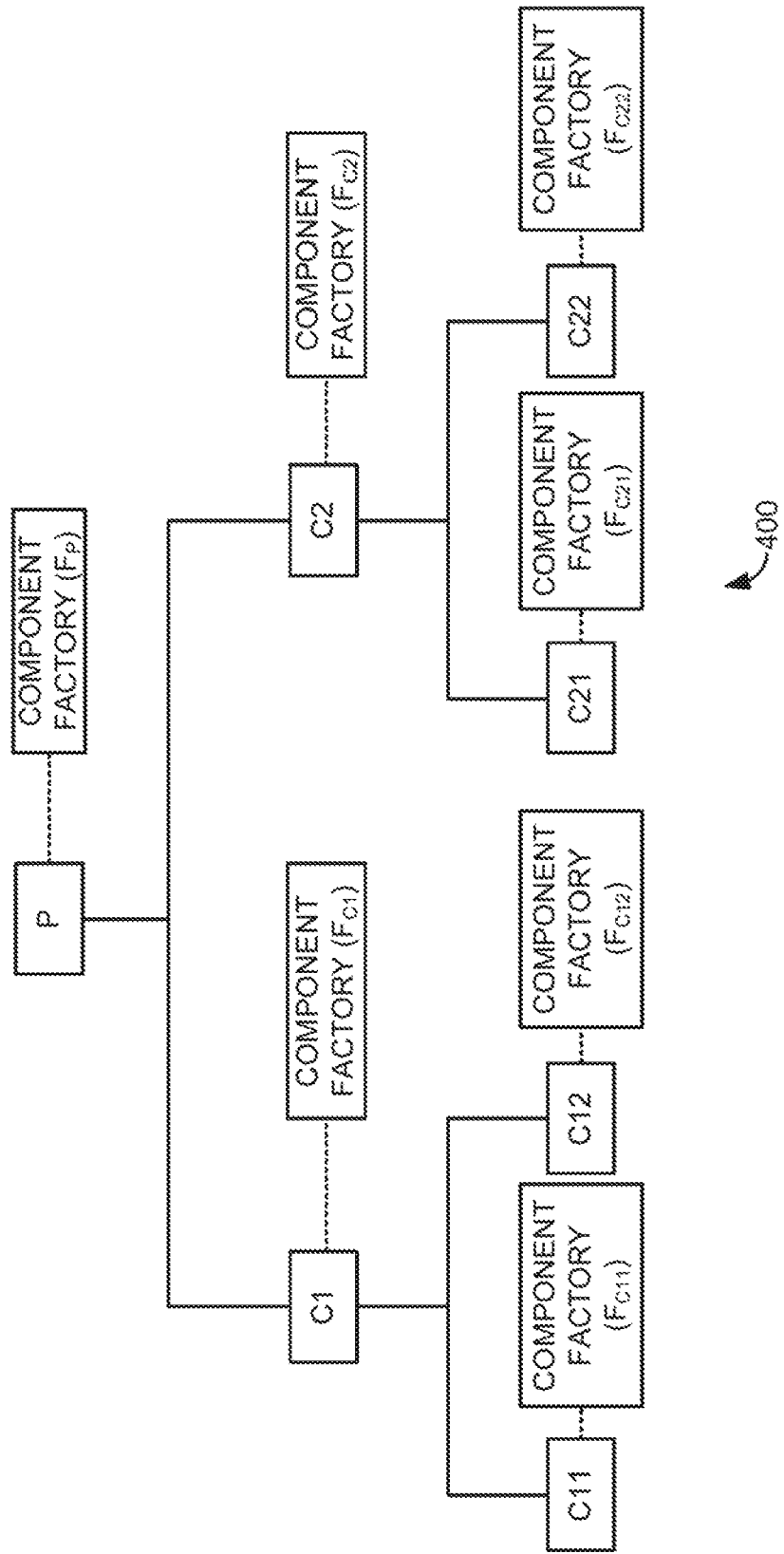
FIG. 4 illustrates an example hierarchical tree data structure, depicting a component factory associated with each UI component.

FIG. 4 illustrates an example hierarchical tree data structure 400, depicting a component factory associated with each UI component. At each UI component in the hierarchy, a component factory is provided to decide which child UI component to be dynamically created and rendered during run time. For example, as shown in FIG. 4, a component factory $F_P$ may be provided for parent UI component P to decide whether to create and render child UI component C1 or C2 (e.g., at a second level in the hierarchy). Further as shown in FIG. 4, a component factory $F_{C1}$ may be provided for UI component C1 to decide whether to create and render child UI component C11 or C12 (e.g., at a third level in the hierarchy). Similarly, a component factory $F_{C11}$ may be provided for UI component C11 to decide which child UI components to be created and rendered at further level. The configuration options for defining the component factories may include annotation based configuration or inheritable JSON/XML/YAML file configurations. Examples for annotation based configuration or inheritable JSON/XML/YAML file configuration are as follows.

Example Annotation Based Configuration:

In this example, an annotation may need to be declared on a UI component and the UI framework can automatically register the UI component to common registry 204 using the "name", "identifier (ID)" and "parent ID" configurations defined in the annotation. Example "ID" of the UI component may include a string, a universally unique identifier (UUID), or any JSON object that helps in uniquely identifying the UI component.

Register annotation for the parent UI component: The annotation when declared on the UI component, the UI component may register itself with the registry 204. Since this declaration does not have "parent ID" defined, it will be registered with the component factory of the root main UI component. An example annotation for the parent UI component includes:

```
@Register({
    name: "SCALE IN",
    id: "SCALE_IN",
})
```

Register annotation for the child UI component: The annotation when declared on the UI component, the UI component may register itself with common registry 204. Since this declaration has the "parent ID defined", it will be registered with the parent "SCALE_IN" component factory, which can be used for injecting the corresponding UI component. An example annotation for the child UI component includes:

```
@Register({
    name: "VSPHERE",
    id: "VSPHERE",
    parentId: "SCALE_IN"
})
```

After registering, if there is a request for the component with ID "SCALE_IN" from the main component, the root component factory checks and creates the "SCALE_IN" UI component. From the "SCALE_IN" UI component, if there is a request for a UI component with ID "VSPHERE", then the request goes to "SCALE_IN" component factory which then checks its child component factory for creating "VSPHERE" UI component. Since the parent→child relationship is established in the annotation, the "SCALE_IN" component factory takes care of creation of the UI component based on the ID.

Example JSON File Configuration:

An example for JSON file configuration for parent UI component may include:

```
Parent.json:
{
    Parent: null,
    Config: [
        {
            "name": "SCALE IN",
            "id": "SCALE_IN"
        },
        {
            "name": "SCALE OUT",
            "id": "SCALE_OUT"
        }
    ]
}
```

An example for JSON file configuration for child UI component may include:

```
Child1.json:
{
    Parent: ./Parent.json,
    ParentId: "SCALE_IN"
    Config: [
        {
            "name": "VSPHERE",
            "id": "VSPHERE"
        }
    ]
}
```

As shown in the above examples, each JSON file configuration may include multiple parent UI components. Hence, JSON file configuration for child UI component may be mapped to one of the multiple parent UI components based on parent name and parent ID. In this example, rendering unit 212 may include a static rendering unit or a dynamic rendering unit. The hierarchical tree data structure can be created with both statically created UI components and dynamically created UI components. In one example, the static rendering unit may render the static UI components and the dynamic rendering unit may render the dynamic UI components by reading the JSON context and deciding on which element to render. Context mapping unit 302 may maintain the context information about the current UI action and acts as a bridge between the various UI components and the main component. A component factory may be used to decide which rendering unit to instantiate, i.e., the static or the dynamic rendering unit. Context mapping unit 302 may map the configuration to the current context during rendering of the UI component.

Examples described herein may be implemented in a cloud computing environment where a set of resources may be allocated to one or more clients. Examples described herein can be implemented in vRealize Automation®, vRealize Operations, vRBC, and/or the like that are offered by VMware. Examples described herein can be used in cloud automation management tools, for instance, to scale-in or scale-out the number of instances of VMs. In one example, registration unit 202, receiving unit 208, component generation unit 210, rendering unit 212, and context mapping unit 302 may be implemented as engines or modules comprising any combination of hardware and programming to implement the functionalities described herein.

In some examples, the functionalities described herein, in relation to instructions to implement functions of registration unit 202, receiving unit 208, component generation unit 210, rendering unit 212, and context mapping unit 302 and any additional instructions described herein in relation to the storage medium, may be implemented as engines or modules comprising any combination of hardware and programming to implement the functionalities of the modules or engines described herein. The functions of registration unit 202, receiving unit 208, component generation unit 210, rendering unit 212, and context mapping unit 302 may also be implemented by respective processor. In examples described herein, the processor may include, for example, one processor or multiple processors included in a single device or distributed across multiple devices.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 6:
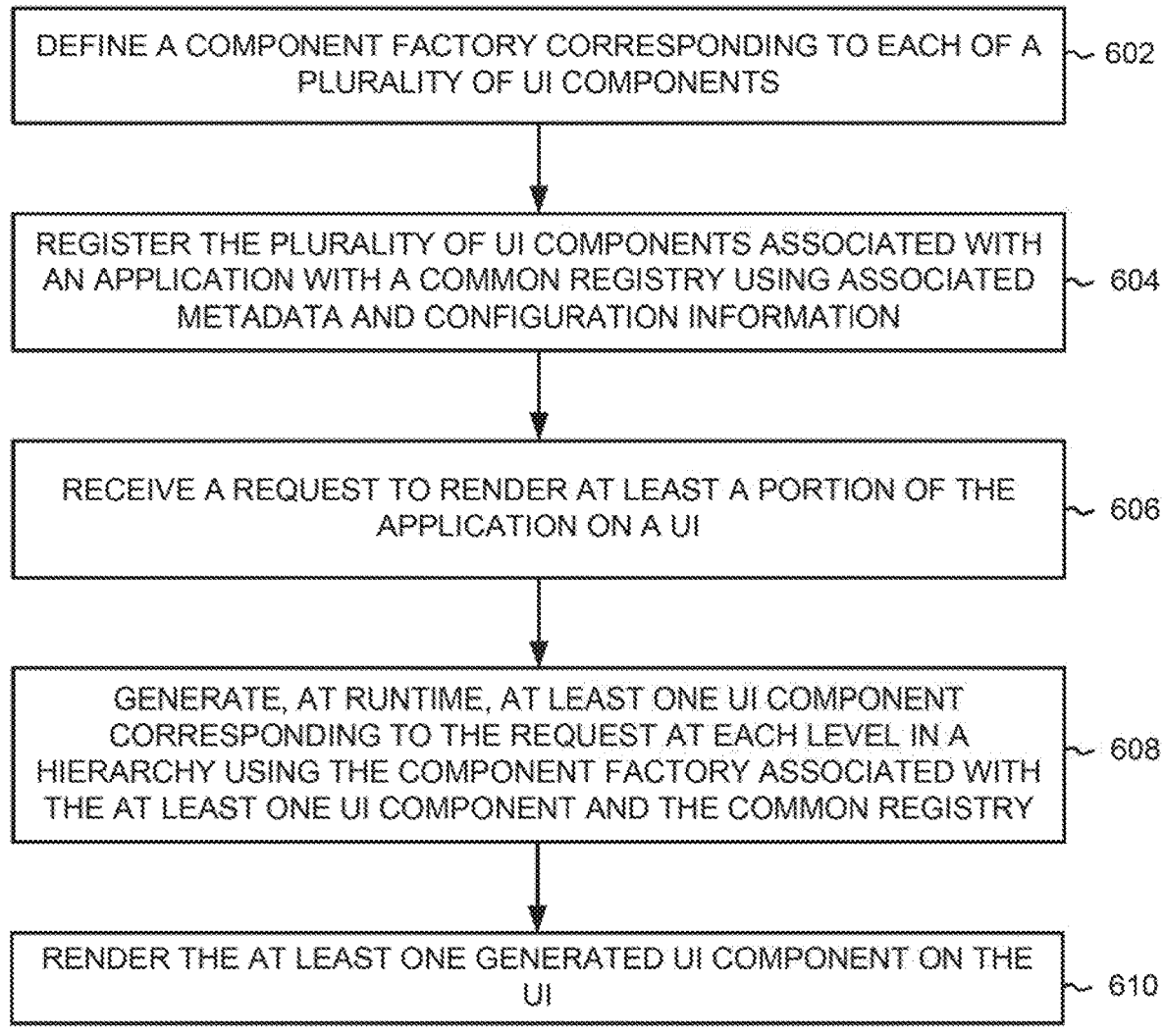
FIG. 6 illustrates a flow diagram of an example method to dynamically generate UI components based on hierarchical component factories.

FIG. 6 illustrates a flow diagram 600 of an example method to dynamically generate UI components based on hierarchical component factories. It should be understood that the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, a component factory corresponding to each of a plurality of UI components may be defined. At 604, the plurality of UI components associated with an application may be registered with a common registry using associated metadata and configuration information. Each UI component may be mapped to a component factory of an associated parent UI component based on the associated metadata. In one example, each of the plurality of UI components associated with the application may be registered with the common registry using a name, an identifier, and a parent identifier information. The plurality of UI components associated with the application may be registered with the common registry, at run time, during loading of the UI components into a browser.

Further, each UI component may be mapped to the component factory of the associated parent UI component in the hierarchy based on the parent identifier information defined in each component. For example, the name, the identifier, and the parent identifier information may be defined in each component using an annotation based approach or a configuration file based approach. Example the configuration file based approach may include a file selected from a group consisting of JSON, XML, and YAML configuration file that declares hierarchical configurations.

At 606, a request to render at least a portion of the application on a UI may be received, for instance, from a user. At 608, at least one UI component corresponding to the request at each level in a hierarchy may be generated at runtime, using the component factory associated with the at least one UI component and the common registry. The plurality of UI components associated with the application may be generated during loading of the UI components at runtime in the browser. In one example, the plurality of UI components may include the parent UI component and at least one child UI component. The UI components corresponding to the requested portion of the application at each level in the hierarchy may be generated by:

a. generating a parent UI component using a component factory associated with the parent UI component and the common registry in response to the request at a first level in the hierarchy,
b. determining the at least one child component using the component factory associated with the parent UI component, and
c. generating the at least one child component using metadata and configuration information associated with the at least one child component in the common registry at a second level in the hierarchy.

At 610, the at least one generated UI component may be rendered on the UI. In one example, context information associated with the at least one UI component may be retrieved, and then the at least one generated UI component may be rendered on the UI according to the retrieved context information. Further, information associated with the generated at least one UI component may be stored in at least one of a local cache or in a server. In one example, storing the information associated with the generated at least one UI component in the server may enable reusing of the generated at least one UI component across multiple clients. The method for dynamically generating the UI components based on hierarchical component factories is explained in more detail with reference to FIGS. 1-5.

Figure 7:
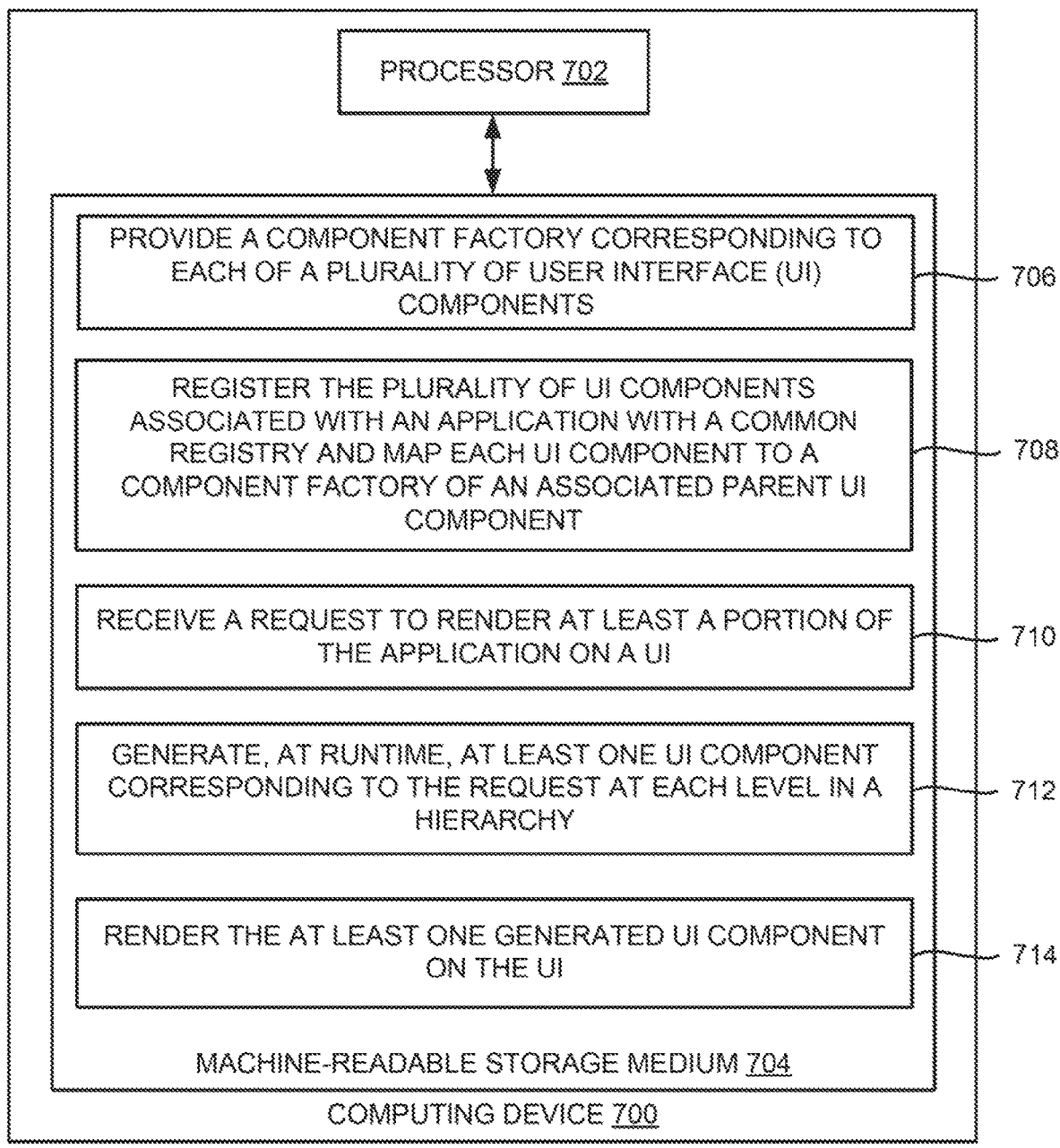
FIG. 7 is a block diagram of an example computing device including non-transitory computer-readable storage medium storing instructions to dynamically generate UI components based on hierarchical component factories.

FIG. 7 is a block diagram of an example computing device 700 including non-transitory computer-readable storage medium storing instructions to dynamically generate UI components based on hierarchical component factories. Computing device 700 (e.g., client 104 of FIG. 1) includes a processor 702 and a machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a RAM or another type of dynamic storage device that may store information and machine-readable instructions that may be executed by processor 702. For example, machine-readable storage medium 704 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 704 may be a non-transitory machine-readable medium. In an example, machine-readable storage medium 704 may be remote but accessible to computing device 700.

Machine-readable storage medium 704 may store instructions 706-714 that can be executed by processor 702. Instructions 706 may be executed by processor 702 to provide a component factory corresponding to each of a plurality of UI components. Instructions 708 may be executed by processor 702 to register the plurality of UI components associated with an application with a common registry using associated metadata and configuration information and map each UI component to a component factory of an associated parent UI component based on the associated metadata. Instructions 710 may be executed by processor 702 to receive a request to render at least a portion of the application on a UI. Instructions 712 may be executed by processor 702 to generate, at runtime, at least one UI component corresponding to the request at each level in a hierarchy using the component factory associated with the at least one UI component and the common registry. Instructions 714 may be executed by processor 702 to render the at least one generated UI component on the UI.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method for rendering an application user interface (UI) within a cloud computing environment that supports the creation, deployment, and management of virtual machine-based ("VM-based") cloud applications for execution and display on a plurality of client devices, the method comprising:
defining a pool of UI components associated with a VM-based cloud application, the pool of components including a plurality of parent UI components and a plurality of child UI components;
registering each of the pool of UI components associated with the VM-based cloud application with a common registry maintained at each client device executing the cloud application, wherein the common registry uses an annotation based approach or a configuration file based approach to map each of the plurality of child UI components to an associated parent UI component, creating a hierarchy of UI components, such that a subset of multiple child UI components are mapped to a first parent UI component rather than hard coding a 1:1 dependency between parent and child UI components;

defining configuration information within the common registry to:
identify a plurality of client device types, including at least a first client device type having a first browser and a second client device type having a second browser different from the first browser; and
identify one or more preferred child UI components from the subset of multiple child UI components to associate with the first parent UI component for the first client device type but not for the second client device type;

in response to receiving a first request to render at least a portion of an application on a UI from a first client device belonging to the first client device type:
generating the first parent UI component;
based on the configuration information, selecting the one or more preferred child UI components from the subset of multiple child UI components; and
generating the one or more preferred child UI components;

updating, by a remote administrator, the configuration information to identify a first new preferred or first newly-available child UI component from the subset of multiple child UI components to associate with the first parent UI component for the first client device type but not the second client device type and a second newly preferred or second newly-available child UI component from the subset of multiple child UI components to associate with the first parent UI component for the second client device type but not the first client device type;

in response to receiving a second request to render at least the portion of the application on the UI from the first client device:
generating the first parent UI component;
based on the updated configuration information, selecting at least the first new preferred or first newly-available child UI component from the subset of multiple child UI components; and
generating at least the first new preferred or first newly-available child UI component.

2. The method of claim 1, wherein each UI component of the pool of UI components is registered with the common registry using a respective annotation that defines a name, an identifier, and a parent identifier information for each UI component.

3. The method of claim 2, wherein each child UI component is mapped within the hierarchy to the associated parent UI component based on parent identifier information defined in a respective annotation of each child UI component.

4. The method of claim 1, wherein the plurality of UI components are registered with the common registry, at run time, during loading of the pool of UI components into a browser.

5. The method of claim 1, wherein the pool of UI components comprises the first parent UI component in a first level of the hierarchy and the one or more preferred child UI components in a second level of the hierarchy, the one or more preferred child UI components having at least one child UI component in a third level of the hierarchy.

6. The method of claim 1, wherein rendering the one or more preferred child UI components on the UI comprises:
retrieving context information associated with the one or more preferred child UI components; and
rendering the one or more preferred child UI components on the UI according to the retrieved context information.

7. The method of claim 1, wherein the pool of UI components are generated during loading of the pool of the UI components at runtime in a browser.

8. The method of claim 1, further comprising:
storing information associated with the one or more preferred child UI components in at least one of a local cache or in a server,
wherein storing the information in the server enables reusing of the one or more preferred child UI components across multiple clients.

9. A system for rendering an application user interface (UI) within a cloud computing environment that supports the creation, deployment, and management of VM-based cloud applications for execution and display on a plurality of client devices, the system comprising:
a memory storage including a non-transitory, computer-readable medium comprising instructions; and
a processor executing stages comprising:
generating a pool of UI components associated with a VM-based cloud application, the pool of components including a plurality of parent UI components and a plurality of child UI components;
registering the pool of UI components associated with the VM-based cloud application with a common registry maintained at each client device executing the cloud application, wherein the common registry uses an annotation based approach or a configuration file based approach to map each of the plurality of child UI components to an associated parent UI component, creating a hierarchy of UI components, such that a subset of multiple child UI components are mapped to a first parent UI component rather than hard coding a 1:1 dependency between parent and child UI components;
defining configuration information within the common registry for:
identifying a plurality of client device types, including at least a first client device type having a first browser and a second client device type having a second browser different from the first browser; and
identifying one or more preferred child UI components from the subset of multiple child UI components to associate with the first parent UI component for the first client device type but not the second client device type;
in response to receiving a first request to render at least a portion of an application on a UI from a first client device belonging to the first client device type:
generating the first parent UI component;
based on the configuration information, selecting the one or more preferred child UI components from the subset of multiple child UI components; and
generating the one or more preferred child UI components;
wherein the configuration information is updated, by a remote administrator, to identify a first new preferred or first newly-available child UI component from the subset of multiple child UI components to associate with the first parent UI component for the first client device type but not the second client device type and a second newly preferred or second newly-available child UI component from the subset of multiple child UI components to associate with the first parent UI component for the second client device type but not the first client device type, and wherein, in response to receiving a second request to render at least the portion of the application on the UI from the first client device:

generating the first parent UI component;

based on the updated configuration information, selecting at least the first new preferred or first newly-available child UI component from the subset of multiple child UI components; and generating at least the first new preferred or first newly-available child UI component.

10. The computing device of claim 9, wherein the registering further includes registering each UI component of the pool of UI components with the common registry using a respective annotation that defines a name, an identifier, and a parent identifier information for each UI component.

11. The computing device of claim 10, wherein the registering further includes mapping each UI component to an associated parent UI component in the hierarchy based on parent identifier information defined in a respective annotation of each UI component.

12. The computing device of claim 9, wherein the registering further includes registering the pool of UI components with the common registry during loading of the pool of UI components at runtime in a browser.

13. The computing device of claim 9, wherein the registering further includes storing the associated metadata and configuration information in a configuration database.

14. The computing device of claim 9, wherein the pool of UI components comprises the first parent UI component in a first level of the hierarchy and the one or more preferred child UI components in a second level of the hierarchy, the one or more preferred child components having at least one child UI component in a third level of the hierarchy.

15. The computing device of claim 9, further comprising:

retrieving context information associated with the one or more preferred child UI components, rendering the one or more preferred child UI components on the UI according to the retrieved context information.

16. The computing device of claim 9, further comprising:

generating the pool of UI components during loading of the pool of UI components at runtime in a browser.

17. The computing device of claim 9, further comprising:

storing information associated with the one or more preferred child UI components in memory associated with the computing device or in memory associated with a server via a network.

18. The computing device of claim 9, further comprising:

upon receipt of the updated configuration information:

determining whether the new preferred or newly-available child UI component is available in a cache associated with the computing device or the server;

generating the new preferred or newly-available child UI component, rendering the generated new preferred or newly-available child UI component on the UI, and adding the generated new preferred or newly-available child UI component to the cache associated with the computing device or the server in response to determining the new preferred or newly-available child UI component is not available; and retrieving the new preferred or newly-available child UI component from the cache and rendering the retrieved new preferred or newly-available child UI component on the UI in response to determining the new preferred or newly-available child UI component is available.

19. The computing device of claim 9, wherein the first parent UI component is overridable by redefining the configuration information associated with the first parent UI component.

20. A non-transitory, machine-readable medium storing instructions for rendering an application user interface (UI) within a cloud computing environment that supports the creation, deployment, and management of VM-based cloud applications for execution and display on a plurality of client devices, the instructions executable by a processing resource to:

provide a pool of UI components associated with a VM-based cloud application, the pool of components including a plurality of parent UI components and a plurality of child UI components;

register each of the pool of UI components associated with the VM-based cloud application with a common registry maintained at each client device executing the cloud application, wherein the common registry uses an annotation based approach or a configuration file based approach to map each of the plurality of child UI components to an associated parent UI component, creating a hierarchy of UI components, such that a subset of multiple child UI components are mapped to a first parent UI component rather than hard coding a 1:1 dependency between parent and child UI components;

define configuration information within the common registry to:

identify a plurality of client device types, including at least a first client device type having a first browser and a second client device type having a second browser different from the first browser; and identify one or more preferred child UI components from the subset of multiple child UI components to associate with the first parent UI component for the first client device type but not for the second client device type;

in response to receiving a first request to render at least a portion of an application on a UI from a first client device belonging to the first client device type:

generate the first parent UI component;

based on the configuration information, select the one or more preferred child UI components from the subset of multiple child UI components; and generate the one or more preferred child UI components;

receive updated hierarchical configuration identifying a first new preferred or first newly-available child UI component from the subset of multiple child UI components to associate with the first parent UI component for the first client device type but not the second client device type and a second newly preferred or second newly-available child UI component from the subset of multiple child UI components to associate with the first parent UI component for the second client device type but not the first client device type;

in response to receiving a second request to render at least the portion of the application on the UI from the first client device:
    generate the first parent UI component;
    based on the updated configuration information, select at least the first new preferred or first newly-available child UI component from the subset of multiple child UI components; and
    generate at least the first new preferred or first newly-available child UI component.

21. The non-transitory machine-readable medium of claim 20, wherein each UI component of the pool of UI components is registered with the common registry using a name, a respective annotation that respectively defines an identifier, and a parent identifier information for each UI component.

22. The non-transitory machine-readable medium of claim 21, wherein each child UI component is mapped within the hierarchy to the associated parent UI component based on parent identifier information defined in a respective annotation of each child UI component.

23. The non-transitory machine-readable medium of claim 20, wherein the pool of UI components are registered with the common registry, at run time, during loading of the plurality of UI components into a browser.

24. The non-transitory machine-readable medium of claim 20, wherein the pool of UI components comprises the first parent UI component in a first level of the hierarchy and the one or more preferred child UI components in a second level of the hierarchy, the one or more preferred child UI components having at least one child UI component in a third level of the hierarchy.

25. The non-transitory machine-readable medium of claim 20, wherein rendering the one or more preferred child UI components on the UI comprises:
    retrieving context information associated with the one or more preferred child UI components from a context unit; and
    rendering the one or more preferred child UI components on the UI according to the retrieved context information.

26. The non-transitory machine-readable medium of claim 20, comprising instructions to, upon receipt of the updated configuration information:
    determine an availability of the new preferred or newly-available child UI component in a cache associated with the processing resource;
    generate the new preferred or newly-available child UI component, render the generated new preferred or newly-available child UI component on the UI, and add the generated new preferred or newly-available child UI component to the cache associated with the processing resource in response to a determination that the new preferred or newly-available child UI component is not available; and
    retrieve the new preferred or newly-available child UI component from the cache and render the retrieved new preferred or newly-available child UI component on the UI in response to a determination that the new preferred or newly-available child UI component is available.

\* \* \* \* \*